(12) United States Patent
Onoda et al.

(10) Patent No.: US 11,394,218 B2
(45) Date of Patent: Jul. 19, 2022

(54) CONTROLLER, ELECTRICITY STORAGE SYSTEM, AND RECORDING MEDIUM

(71) Applicant: Panasonic Intellectual Property Management Co., Ltd., Osaka (JP)

(72) Inventors: Senichi Onoda, Osaka (JP); Yoshikatsu Ito, Tokyo (JP); Satoshi Sugimoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 342 days.

(21) Appl. No.: 16/610,069

(22) PCT Filed: May 14, 2018

(86) PCT No.: PCT/JP2018/018563
§ 371 (c)(1),
(2) Date: Oct. 31, 2019

(87) PCT Pub. No.: WO2018/212135
PCT Pub. Date: Nov. 22, 2018

(65) Prior Publication Data
US 2022/0037898 A1 Feb. 3, 2022

(30) Foreign Application Priority Data
May 19, 2017 (JP) .............................. JP2017-100002

(51) Int. Cl.
*H02J 7/00* (2006.01)
*G08B 5/22* (2006.01)
*H02J 7/35* (2006.01)

(52) U.S. Cl.
CPC .............. *H02J 7/0047* (2013.01); *G08B 5/22* (2013.01); *H02J 7/35* (2013.01)

(58) Field of Classification Search
CPC .... H02J 7/0047; H02J 7/35; H02J 3/38; H02J 3/46; H02J 13/00; H02J 3/32; G08B 5/22;
(Continued)

(56) References Cited

U.S. PATENT DOCUMENTS 9,136,732 B2 * 9/2015 Wolter .................... H02S 40/38
2012/0161523 A1 6/2012 Kim et al.
(Continued)

FOREIGN PATENT DOCUMENTS

JP 2014-072163 A 4/2014
JP 2014-87129 A 5/2014
(Continued)

OTHER PUBLICATIONS

Office Action for corresponding JP Application No. 2017-100002 dated Sep. 28, 2021.
(Continued)

*Primary Examiner* — Omeed Alizada
(74) *Attorney, Agent, or Firm* — Renner, Otto, Boisselle & Sklar, LLP (57) ABSTRACT

A controller in an electricity storage system that includes a first DC/DC converter connected to a storage battery, and a bidirectional inverter connected to the first DC/DC converter. The controller includes a control circuit which changes a content to be displayed by a display, according to whether the electricity storage system is in a predetermined state in which a first PV is connected to the bidirectional inverter via a DC bus.

5 Claims, 5 Drawing Sheets

(58) Field of Classification Search
CPC ......... Y02E 10/56; Y02E 40/70; Y02E 60/00; Y02E 70/30; Y04S 10/123; Y04S 10/14; H02S 10/20
See application file for complete search history.

(56) References Cited

U.S. PATENT DOCUMENTS

| | | | | |
|---|---|---|---|---|
| 2015/0109133 A1* | 4/2015 | Andre | ............... | H02J 13/00001 340/657 |
| 2018/0233914 A1* | 8/2018 | Miki | ................... | G05B 13/026 |
| 2019/0326752 A1* | 10/2019 | Kikuchi | ................... | H02J 3/38 |

FOREIGN PATENT DOCUMENTS

| | | |
|---|---|---|
| JP | 2015-139331 A | 7/2015 |
| JP | 2016-15864 A | 1/2016 |
| JP | 2016-105698 A | 6/2016 |
| WO | WO 2017/026287 | 2/2017 |

OTHER PUBLICATIONS

Extended European Search Report dated Apr. 23, 2020 for corresponding European Application No. EP 18802991.2.
International Search Report for corresponding Application No. PCT/JP2018/018563, dated Jun. 12, 2018.

\* cited by examiner

CONTROLLER, ELECTRICITY STORAGE SYSTEM, AND RECORDING MEDIUM

TECHNICAL FIELD

The present disclosure relates to a controller for controlling an electricity storage system that is connected with a storage battery, an electricity storage system that includes the controller, and a program recording medium.

BACKGROUND ART

Conventionally, there have been storage battery units which are charged with electric power supplied from a system power source, a solar cell module, and the like. For example, Patent Literature (PTL) 1 discloses a power conditioner which is capable of causing a storage battery to be charged with energy generated by a solar cell module, and supplying electric power to a load (electric power load) of electrical equipment.

CITATION LIST

Patent Literature

PTL 1: Japanese Unexamined Patent Application Publication No. 2016-15864

SUMMARY OF THE INVENTION

Technical Problem

A storage battery that is connected with an electricity storage system is charged with electric power generated by a solar cell module via a DC/DC converter, for example. The electric power with which the storage battery is charged is converted from direct current (DC) electric power to alternating current (AC) electric power, and then supplied to a load used in a home, for example.

Here, for example, if the solar cell module and the DC/DC converter which the electricity storage system includes are not properly connected, the storage battery that is connected with the electricity storage system will not be charged with electric power generated by the solar cell module. However, when a user of the electricity storage system is to check whether the state of the connection is proper, the installation location of the solar module and the electricity storage system, the wiring, etc. would sometimes make it difficult for the user to check the state of the connection, and thus user convenience was poor.

In view of the above, the present disclosure provides a controller, an electricity storage system, and a recording medium with improved user convenience.

Solutions to Problem

A controller according to an aspect of the present disclosure is a controller in an electricity storage system that includes a first DC/DC converter connected to a storage battery, and a bidirectional inverter connected to the first DC/DC converter, the controller includes: a control circuit which changes a content to be displayed by a display connected with the controller, according to whether the electricity storage system is in a predetermined state in which a solar cell module is connected to the bidirectional inverter via a DC bus.

In addition, an electricity storage system according to an aspect of the present disclosure includes: the controller described above; the first DC/DC converter; the bidirectional inverter; and a second DC/DC converter connected between the solar cell module and the bidirectional inverter.

Furthermore, a recording medium according to an aspect of the present disclosure is a non-transitory computer-readable recording medium in which a program for causing a computer to execute a control method for controlling an electricity storage system that includes a first DC/DC converter connected to a storage battery, and a bidirectional inverter connected to the first DC/DC converter is recorded, the control method includes: changing a content to be displayed by a display, according to whether the electricity storage system is in a predetermined state in which a solar cell module is connected to the bidirectional inverter via a DC bus.

In addition, the present disclosure may be realized by a computer-readable recording medium, such as a CD-ROM, in which a program according to an aspect of the present disclosure is recorded. Furthermore, the present disclosure may be realized as information, data, or a signal which indicates the program. Moreover, the program, the information, the data, and the signal may be distributed via a communication network, such as the Internet.

Advantageous Effect of Invention

A controller and the like according to the present disclosure improve user convenience.

DESCRIPTION OF EXEMPLARY EMBODIMENTS

Hereinafter, a controller according to embodiments, an electricity storage system according to the embodiments, and a recording medium according to the embodiments will be described with reference to the drawings. The embodiments described below each show a general or a specific example. The numerical values, shapes, materials, structural elements, the arrangement and the connection of the structural elements, steps, the order of the steps, and the like described in the following embodiments are mere examples, and thus are not intended to limit the present disclosure. Furthermore, among the structural elements in the following embodiments, structural elements not recited in any of the independent claims defining the most generic part of the inventive concept are described as optional structural elements.

Note that the drawings are schematic diagrams and do not necessarily provide strictly accurate illustrations. Throughout the drawings, the same sign is given to substantially the same configuration, and redundant description is omitted or simplified.

Embodiment

[Configuration of Controller and Electricity Storage System]

A controller according to an embodiment and an electricity storage system according to the embodiment will be described with reference to FIG. 1 and FIG. 2.

Figure 1:
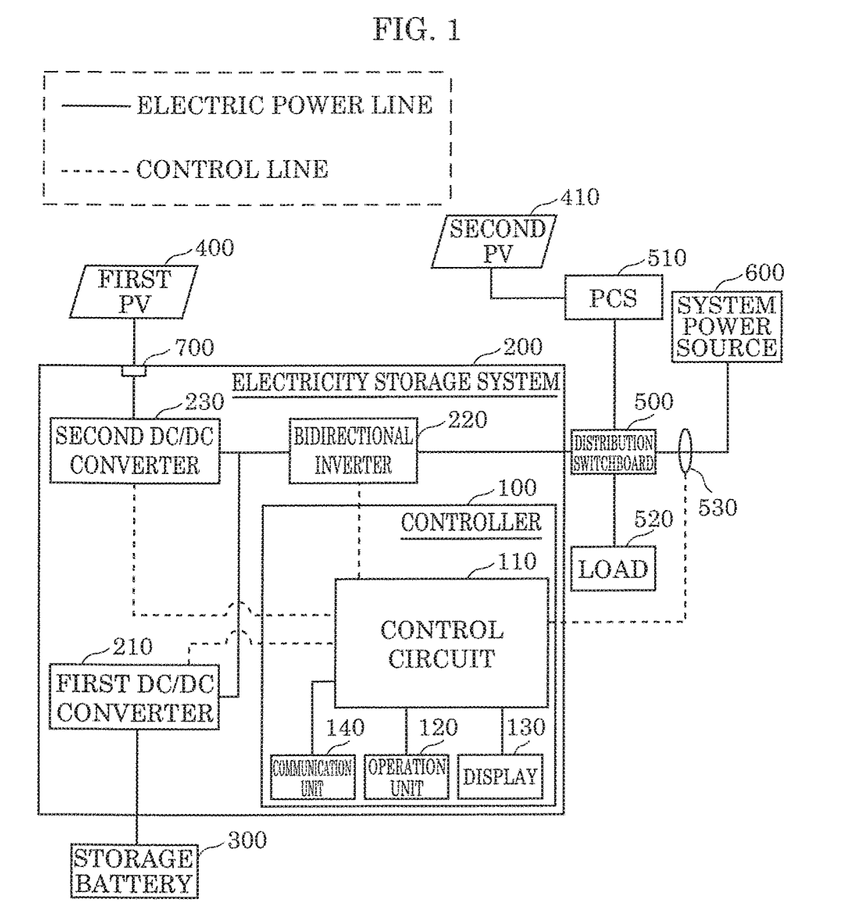
FIG. 1 is a block diagram illustrating a system that includes a controller according to an embodiment and an electricity storage system according to the embodiment.

FIG. 1 is a block diagram illustrating a system that includes a controller according to an embodiment and an electricity storage system according to the embodiment.

Controller 100 is a control device that controls electricity storage system 200. Specifically, controller 100 controls first DC/DC converter 210, bidirectional inverter 220, and second DC/DC converter 230 which are included in electricity storage system 200. Controller 100 is communicably connected with each of first DC/DC converter 210, bidirectional inverter 220, and second DC/DC converter 230 which are included in electricity storage system 200. For example, controller 100 is communicably connected with first DC/DC converter 210, bidirectional inverter 220, and second DC/DC converter 230 which are included in electricity storage system 200 via respective control lines (wiring). In addition, controller 100 may be communicably connected with each of first DC/DC converter 210, bidirectional inverter 220, and second DC/DC converter 230 which are included in electricity storage system 200 in a wireless manner. In other words, controller 100 and the other structural elements which are included in electricity storage system 200 may be individually configured, or integrally configured in one housing. That is, controller 100 may be the so-called remote controller.

Electricity storage system 200 is a device for controlling the charge and the discharge of storage battery 300. Storage battery 300 is, for example, a lithium ion battery and a lead storage battery, and is connected with first DC/DC converter 210 using an electric power line that is a direct current (DC) bus. For example, when storage battery 300 is charged with electric power from system power source 600 which is an external commercial power source via distribution switchboard 500 which is connected with bidirectional inverter 220 using an electric power line that is an alternating current (AC) bus, controller 100 controls the direction of electric power conversion performed by bidirectional inverter 200. Specifically, controller 100 converts the alternating current (AC) electric power supplied from system power source 600 into direct current (DC) electric power, and outputs the DC electric power to first DC/DC converter 210. Controller 100 controls the voltage of the DC electric power using first DC/DC 100, and causes storage battery 300 to be charged with the DC electric power. In addition, when the electric power with which storage battery 300 is charged is supplied to load 520, such as an electric appliance, which is connected with distribution switchboard 500, controller 100 controls bidirectional inverter 220 to convert the DC electric power supplied from storage battery 300 to AC electric power, and outputs the AC electric power to system power source 600-side.

In addition, in electricity storage system 200, there may be a case in which a solar cell module (first photovoltaics (PV) 400) is directly connected with second DC/DC converter 230. That is, electricity storage system 200 is a hybrid power conditioner which is connectable with storage battery 300 and first PV 400. Furthermore, in electricity storage system 200, there may be a case in which second PV 410 which is a solar cell module is connected with bidirectional inverter 220 via power conditioning system (PCS) (power conditioner) 510 and distribution switchboard 500. Controller 100 controls the charge and the discharge of storage battery 300 with electric power generated by first PV 400 and/or second PV 410, according to whether first PV 400 and/or second PV 410 is connected with electricity storage system 200.

Controller 100 includes control circuit 110 and operation unit 120.

Control circuit 110 controls the charge and the discharge of storage battery 300 which is connected with electricity storage system 200. Control circuit 110 is realized by, for example, a central processing unit (CPU), and a storage device (not illustrated) in which a control program that the CPU performs is stored. The storage device can be exemplified by read-only memory (ROM), random-access memory (RAM), a hard disk drive (HDD), flash memory, and the like. Note that control circuit 110 may be realized as hardware by a dedicated electric circuit using a gate array and the like.

Control circuit 110 changes a content to be displayed by display 130 which is communicably connected with controller 100, according to whether electricity storage system 200 is in a predetermined state in which first PV 400 is connected to bidirectional inverter 220 via a DC bus. Specifically, control circuit 110 determines whether electricity storage system 200 is in the predetermined state, and changes a content to be displayed by display 130, according to a result of determining whether electricity storage system 200 is in the predetermined state. In FIG. 1, second DC/DC converter 230 is connected with first PV 400 via terminal 700. That is, the state of electricity storage system 200 illustrated in FIG. 1 satisfies the predetermined state.

In addition, control circuit 110 causes display 130 to display an indication regarding the amount of electric power generated by first PV 400. For example, when first PV 400 generates 1.0 kW of electric power, control circuit 110 causes display 130 to display that 1.0 kW of electric power is generated, when electricity storage system 200 is in the predetermined state.

Here, when electricity storage system 200 is not in the predetermined state, control circuit 110 need not cause display 130 to display the indication regarding the amount of electric power generated by first PV 400. Instead, control circuit 110 may cause display 130 to display a fixed value as the amount of electric power generated by first PV 400. The fixed value is not particularly limited, but, for example, control circuit 110 causes display 130 to display 0 as the indication regarding the amount of electric power generated by first PV 400.

In addition, when the state of the connection between electricity storage system 200 and first PV 400 is set by a user, control circuit 110 causes display 130 to display an indication for checking whether the state of connection between second DC/DC converter 230 and first PV 400 is normal, when electricity storage system 200 is in the predetermined state. On the other hand, control circuit 110 causes display 130 not to display the indication for the user to check whether the state of the connection between second DC/DC converter 230 and first PV 400 is normal, when electricity storage system 200 is not in the predetermined state.

In addition, when a voltage of at least a reference value is detected in terminal 700 which connects second DC/DC converter 230 and first PV 400, control circuit 110 causes display 130 to display an indication showing that the voltage of at least the reference value is detected, when electricity storage system 200 is not in the predetermined state.

Terminal 700 is a terminal for electrically connecting second DC/DC converter 230 and first PV 400.

Note that control circuit 110 may obtain, from current transformer (CT) sensor 530 which detects the direction of a current that flows through the AC bus that connects system power source 600 and distribution switchboard 500, a signal indicating whether the current is flowing in the reverse direction, for example. Control circuit 110 may determine, from the signal, whether the current is flowing in the reverse direction. In this case, control circuit 110 may control bidirectional inverter 220 to convert the current from DC to AC or vice versa, according to whether electricity storage system 200 is in the predetermined state.

Operation unit 120 is an input device for obtaining an instruction from a user who operates controller 100. Operation unit 120 is to be configured such that the user is capable of operating operation unit 120. For example, operation unit 120 is realized by a button, a touch panel, and the like. Control circuit 110 determines whether electricity storage system 200 is in the predetermined state from the operation of operation unit 120 performed by the user.

Note that controller 100 may display an image on the display of a personal computer, a smartphone, or the like which the user possesses for the user to operate operation unit 120, but may include display 130.

Display 130 is a display device which displays the charging state and the like of storage battery 300 which is connected with electricity storage system 200. Display 130 is, for example, a display.

Note that the function of operation unit 120 and the function of display 130 may be integrally formed using, for example, a touch panel display and the like. That is, the touch panel display may include the function of operation unit 120 and the function of display 130.

Figure 2:
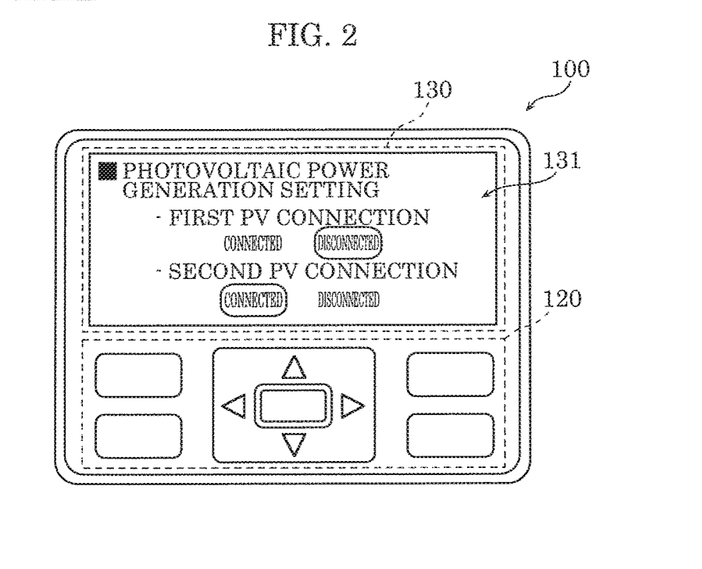
FIG. 2 is a diagram illustrating an example of an image that the controller according to the embodiment causes a display to display when the controller obtains, from a user, an instruction for indicating a state of a connection between the electricity storage system and solar cell modules.

FIG. 2 is a diagram illustrating an example of an image that controller 100 according to the embodiment causes display 130 to display when controller 100 obtains, from a user, an instruction for indicating the state of connection between electricity storage system 200 and solar cell modules (first PV 400 and second PV 410).

As illustrated in FIG. 2, control circuit 110 causes display 130 to display image 131 to obtain, from a user, whether first PV 400 and/or second PV 410 is connected to electricity storage system 200. The user operates operation unit 120 to input whether electricity storage system 200 is connected with at least one of the solar cell modules. Control circuit 110 determines whether electricity storage system 200 is in the predetermined state, based on information about the state of the connection between first PV 400 and electricity storage system 200 which the user inputs.

In addition, controller 100 further includes communication unit 140.

Communication unit 140 is a communication interface for obtaining information which an electric power company that provides system power source 600 transmits. Specifically, communication unit 140 is a communication interface for receiving a signal which the electric power company transmits in a wired or wireless manner. Control circuit 110 causes display 130 to display an image for setting a signal (output control command) to be received via communication unit 140, when electricity storage system 200 is in the predetermined state. The signal indicates an instruction for reducing the amount of electric power that flows in the reverse direction (reverse power flow) into system power source 600. On the other hand, control circuit 110 causes display 130 not to display the image for setting the output control command to be received via communication unit 140, when electricity storage system 200 is not in the predetermined state.

Electricity storage system 200 includes controller 100, first DC/DC converter 210, bidirectional inverter 220, and second DC/DC converter 230.

First DC/DC converter 210 is connected with storage battery 300 using a DC bus, and is a DC/DC converter for controlling the voltage of electric power with which storage battery 300 is charged and discharged.

Bidirectional inverter 220 is a bidirectional DC/AC inverter which is connected with system power source 600, PCS 510, load 520, and the like via distribution switchboard 500 using an AC bus. In addition, bidirectional inverter 220 is connected to storage battery 300 via first DC/DC converter 210 using a DC bus, and connected with first PV 400 via second DC/DC converter 230 using a DC bus. For example, bidirectional inverter 220 converts AC electric power which is inputted from distribution switchboard 500-side into DC electric power, then outputs the DC electric power to storage battery 300-side. Furthermore, bidirectional inverter 220 converts DC electric power which is inputted from storage battery 300-side into AC electric power, then outputs the AC electric power to distribution switchboard 500-side, for example.

Second DC/DC converter 230 is connected with first PV 400 using a DC bus. Second DC/DC converter 230 is a DC/DC converter for controlling the voltage of electric power generated by first PV 400.

[Control of Electricity Storage System]

Next, the control of display 130 included in electricity storage system 200 which control circuit 110 controls will be described in detail.

<Control of Display in Initialization Phase>

Figure 3:
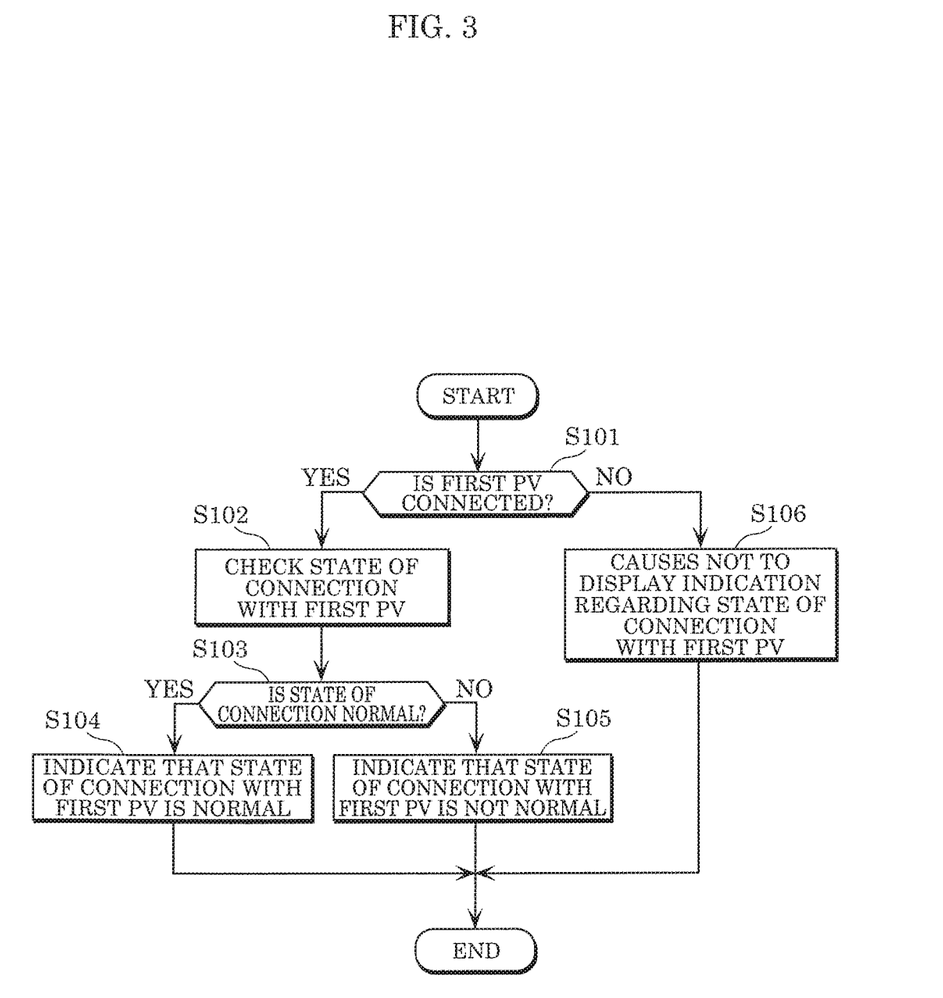
FIG. 3 is a flowchart illustrating a procedure which the controller according to the embodiment performs for determining an image to be displayed by the display.

FIG. 3 is a flowchart illustrating a procedure which controller 100 according to the embodiment performs for determining an image to be displayed by display 130. Specifically, the flowchart illustrated in FIG. 3 is a flowchart for control circuit 110 to determine an image to be displayed by display 130, when a user is to start an operation of electricity storage system 200.

First, control circuit 110 determines, from operation performed by a user, whether electricity storage system 200 is in the predetermined state in which first PV 400 is connected to electricity storage system 200 (step S101). For example, when electricity storage system 200 is activated, control circuit 110 causes display 130 to display image 131 illustrated in FIG. 2. The connection between electricity storage system 200 and first PV 400 is determined to be normal when a voltage of at least a fixed value is applied from first PV 400 to electricity storage system 200. Control circuit 110 determines, from operation of operation unit 120 performed by the user, whether electricity storage system 200 is in the predetermined state.

When control circuit 110 determines, from operation performed by the user, that electricity storage system 200 is in the predetermined state in which first PV 400 is connected to electricity storage system 200 (specifically, second DC/DC converter 230) (YES in step S101), control circuit 110 checks the state of the connection between electricity storage system 200 and first PV 400 (step S102). Control circuit 110 checks whether second DC/DC converter 230 and first PV 400 are electrically connected via terminal 700.

Next, control circuit 110 checks whether the connection between second DC/DC converter 230 and first PV 400 is in a normal connection state (step S103). The normal connection state is a state in which electric power generated by first PV 400 flows to electricity storage system 200-side via terminal 700.

When control circuit 110 determines that the connection between second DC/DC converter 230 and first PV 400 is in the normal connection state (YES in step S103), control circuit 110 causes display 130 to display an image indicating that the connection between electricity storage system 200 and first PV 400 is in the normal connection state (step S104).

On the other hand, when control circuit 110 determines that the connection between second DC/DC converter 230 and first PV 400 is not in the normal connection state (NO in step S103), control circuit 110 causes display 130 to display an image indicating that the connection between electricity storage system 200 and first PV 400 is not in the normal connection state (step S105).

Figure 4A:
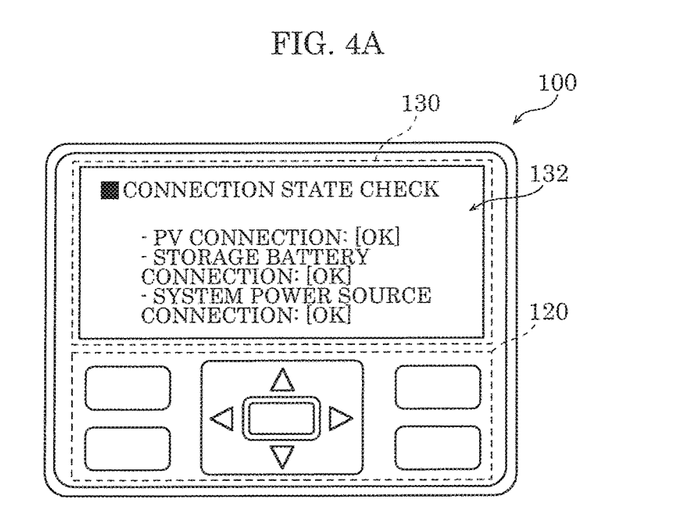
FIG. 4A is a diagram illustrating an example of an image that the controller according to the embodiment causes the display to display when the state of the connection between the electricity storage system and a solar cell module is normal.

FIG. 4A is a diagram illustrating an example of an image that controller 100 according to the embodiment causes display 130 to display when the state of the connection between electricity storage system 200 and solar cell module 400 is normal.

In step S104 illustrated in FIG. 3, control circuit 110 causes display 130 to display image 132 which is illustrated in FIG. 4A, for example. Image 132 provides an indication, such as "PV connection: [OK]", which can notify the user that electricity storage system 200 and first PV 400 are properly connected.

Figure 4B:
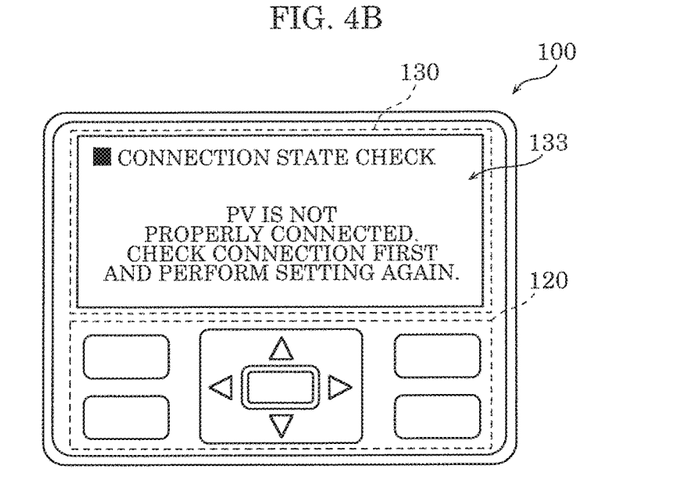
FIG. 4B is a diagram illustrating an example of an image that the controller according to the embodiment causes the display to display when the state of the connection between the electricity storage system and the solar cell module is not normal.

FIG. 4B is a diagram illustrating an example of an image that controller 100 according to the embodiment causes display 130 to display when the state of the connection between electricity storage system 200 and solar cell module 400 is not normal.

In step S105 illustrated in FIG. 3, control circuit 110 causes display 130 to display image 133 which is illustrated in FIG. 4B, for example. Image 133 provides an indication, such as "PV is not properly connected", which can notify the user that electricity storage system 200 and first PV 400 are not properly connected.

As such, controller 100 notifies the user, via display 130, whether the state of the connection between electricity storage system 200 and each of first PV 400, storage battery 300, system electricity source 600, and the like which are connected with electricity storage system 200 is normal. Note that when second PV 410 is connected to electricity storage system 200, control circuit 110 may cause display 130 to display the state of the connection between electricity storage system 200 and second PV 410. In addition, when controller 100 and a structural element in electricity storage system 200 other than controller 100 is communicably connected in a wireless manner, control circuit 110 may cause display 130 to display the state of wireless communication between controller 100 and the structural element.

The following will be described with reference to FIG. 3 again. When control circuit 110 determines, from operation performed by the user, that electricity storage system 200 is not in the predetermined state in which first PV 400 is connected to electricity storage system 200 (NO in step S101), control circuit 110 causes display 130 not to display an indication regarding the state of the connection between electricity storage system 200 and first PV 400 (step S106). That is, when control circuit 110 determines that electricity storage system 200 is not in the predetermined state, control circuit 110 does not check the state of the connection between electricity storage system 200 and first PV 400. For example, in step S106, control circuit 110 causes display 130 not to display the indication regarding the connection between electricity storage system 200 and first PV 400, and may cause display 130 to display only the state of the connection between electricity storage system 200 and storage battery 300, or between electricity storage system 200 and system power source 600. In addition, for example, when electricity storage system 200 is not in the predetermined state, control circuit 110 may change the indication "PV connection: [OK]" as illustrated in FIG. 4A to an indication "PV connection: [n/a]".

Next, the control of electricity storage system 200 on output control which controller 100 performs will be described.

In recent years, an electric power purchase scheme for an electric power company to purchase electric power (selling of electric power) generated by a solar cell module has been established. When the electric power generated by a solar cell module is sold, a user makes the electric power generated by the solar cell module to flow in the reverse direction to a system power source-side.

For example, when electricity storage system 200 is to function as a photovoltaic power generation system, "surplus electric power" from which electric power consumed by load 520 is deducted from the total electric power generated is caused to flow in the reverse direction to the system electricity source-side to be sold.

Here, the electric power company transmits, to each of photovoltaic power generation systems, an output control command for limiting the amount of electric power that flows in the reverse direction to the system power source-side using communication networks, such as the Internet, when the supply of electric power greatly exceeds demand, for example. The output control command is a signal indicating an instruction for reducing the amount of electric power that flows in the reverse direction into the system power source. In order to receive the output control command that the electric power company issues, each photovoltaic power generation system has to be connected to the electric power company via a network. For this reason, each photovoltaic power generation system needs to set up a network connection, such as setting the URL of a server of the electric power company, using a setting screen at the time of starting the operation.

Figure 5:
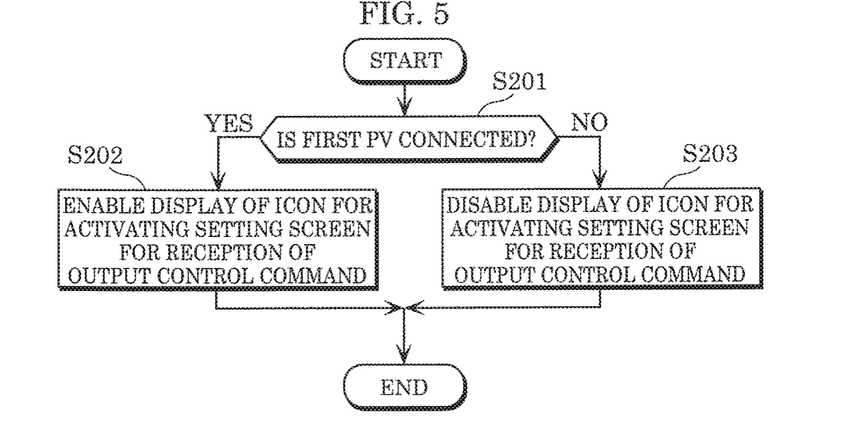
FIG. 5 is a flowchart illustrating an example of a procedure which the controller according to the embodiment causes the display to display an icon for setting reception of an output control command.

FIG. 5 is a flowchart illustrating an example of a procedure which controller 100 according to the embodiment causes display 130 to display an icon for setting reception of an output control command.

First, control circuit 110 determines, from operation performed by a user, that electricity storage system 200 is in the predetermined state in which first PV 400 is connected to electricity storage system 200 (step S201). For example, control circuit 110 causes display 130 to display image 131 illustrated in FIG. 2, when electricity storage system 200 is activated. Control circuit 110 determines, from operation of operation unit 120 performed by the user, whether electricity storage system 200 is in the predetermined state.

When control circuit 110 determines, from operation performed by the user, that electricity storage system 200 is in the predetermined state in which first PV 400 is connected to electricity storage system 200 (YES in step S201), control circuit 110 enables the display of an icon for activating a setting screen for the reception of an output control command (step S202). By selecting the icon for activating the setting screen at the time of starting the operation, the setting screen can be activated for setting the reception of an output control command.

On the other hand, when control circuit 110 determines, from operation performed by the user, that electricity storage system 200 is not in the predetermined state in which first PV 400 is connected to electricity storage system 200 (NO in step S201), control circuit 110 disables the display of the icon for activating the setting screen for the reception of an output control command (step S203). Since the icon for activating the setting screen is not displayed, and thus the icon cannot be selected at the time of starting the operation, the setting screen cannot be activated for setting the reception of an output control command.

Accordingly, controller 100 determines whether the reception of an output control command is needed, according to whether electricity storage system 200 is in the predetermined state, and causes display 130 to change an image that display 130 is caused to display, based on the result of the determination, to clarify whether the setting of the reception at the time of starting the operation is necessary.

<Control of Display in Operation Phase>

Figure 6:
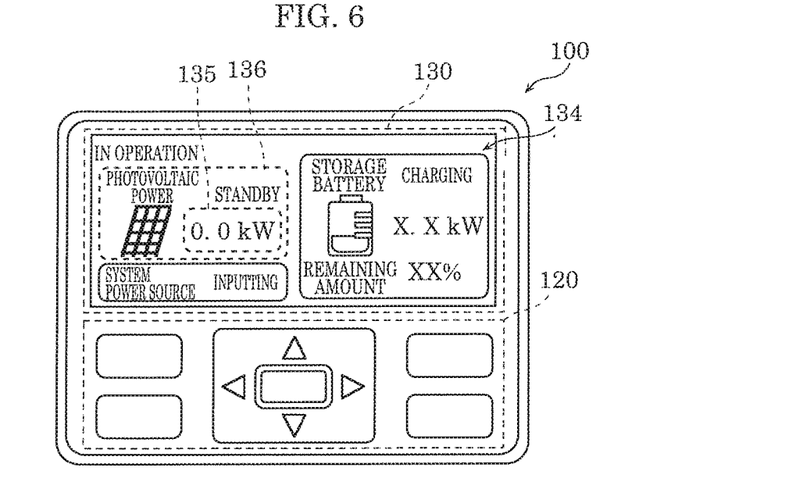
FIG. 6 is a diagram illustrating an example of an image that indicates an amount of electricity generated by the solar cell module which the controller causes the display to display.

FIG. 6 is a diagram illustrating an example of an image that indicates the amount of electric power generated by first PV 400 which controller 100 causes display 130 to display. Specifically, FIG. 6 illustrates an example of an image that control circuit 110 causes display 130 to display when a user is using electricity storage system 200. Note that FIG. 6 illustrates an example of an image in the case in which electricity storage system 200 is not in the predetermined state.

As illustrated in FIG. 6, control circuit 110 causes display 130 to display image 134 when the user is using electricity storage system 200. For example, image 134 indicates the amount of electric power stored (remaining amount) in storage battery 300 which is connected with electricity storage system 200. In addition, image 134 indicates the state of storage battery 300 whether storage battery 300 is charging or discharging.

In addition, image 134 indicates whether first PV 400 which is connected to electricity storage system 200 is generating electric power. For example, when first PV 400 is generating electric power, the amount of electric power which first PV 400 is generating will be indicated in electric power amount indicator 135.

Here, when electricity storage system 200 and first PV 400 are not connected (that is, when electricity storage system 200 is not in the predetermined state), electric power amount indicator 135 need not indicate the amount of electric power which first PV 400 generates. Instead, electric power amount indicator 135 may indicate a fixed value. In other words, when control circuit 110 determines that electricity storage system 200 is not in the predetermined state, control circuit 110 may cause display 130 to display the fixed value as an indication to be indicated in electric power amount indicator 135. For example, control circuit 110 causes 0.0 kW to be displayed as the indication to be indicated in electric power amount indicator 135. Note that when electricity storage system 200 and first PV 400 are not connected, PV indicator 136 that indicates an indication regarding photovoltaic power generation may not be displayed.

Next, control which control circuit 110 performs on display 130 when an anomaly is detected in terminal 700 will be described.

Figure 7:
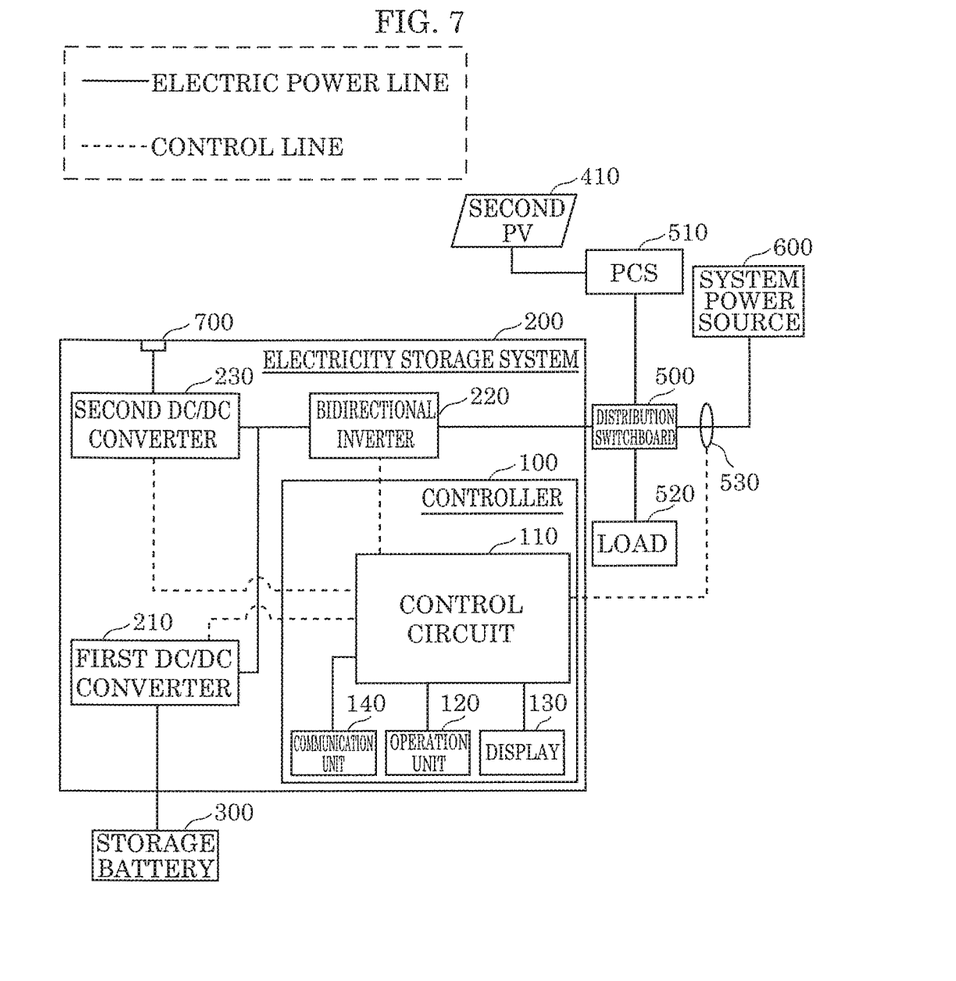
FIG. 7 is a block diagram illustrating a case in which the electricity storage system according to the embodiment is not in a predetermined state.

FIG. 7 is a block diagram illustrating a case in which electricity storage system 200 according to the embodiment is not in the predetermined state.

Unlike electricity storage system 200 illustrated in FIG. 1, first PV 400 and second DC/DC converter 230 are not connected via terminal 700 in electricity storage system 200 illustrated in FIG. 7. That is, electricity storage system 200 illustrated in FIG. 7 is not in the predetermined state. In such a case, since first PV 400 is not connected to terminal 700, a voltage is not normally applied to terminal 700. However, for example, if wiring connected with storage battery 300 is accidentally connected to terminal 700, a voltage is applied to terminal 700. When an unexpected voltage is applied to terminal 700 as described, the unexpected voltage may become a cause of failure of electricity storage system 200, for example. When an abnormal voltage in terminal 700 of at least a reference value is detected, control circuit 110 causes display 130 to display that the abnormal voltage of at least the reference value is detected, when electricity storage system 200 is not in the predetermined state.

Figure 8:
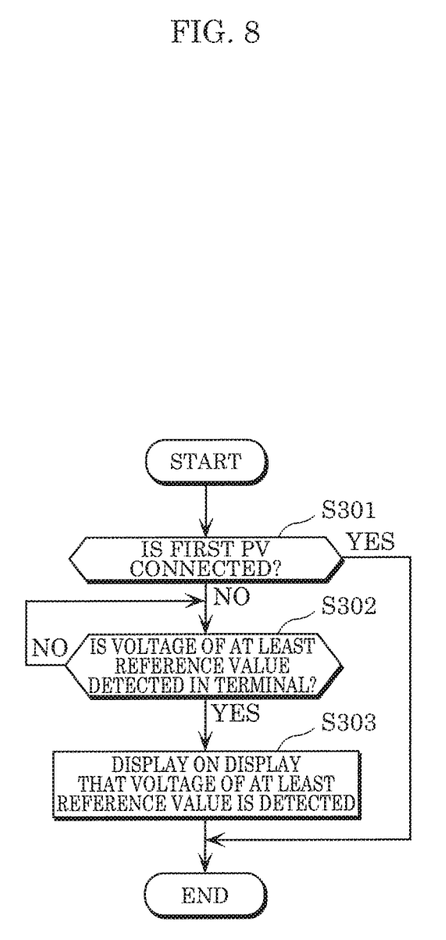
FIG. 8 is a flowchart illustrating an example of a procedure which the controller performs for controlling the display when a voltage of at least a reference value is detected in a terminal included in the electricity storage system according to the embodiment, when the electricity storage system is not in the predetermined state.

FIG. 8 is a flowchart illustrating an example of a procedure which controller 100 performs for controlling display 130 when a voltage of at least a reference value is detected in terminal 700 included in electricity storage system 200 according to the embodiment, when electricity storage system 200 is not in the predetermined state.

First, control circuit 110 determines, from operation performed by a user, whether electricity storage system 200 is in the predetermined state in which first PV 400 is connected to electricity storage system 200 (step S301). For example, control circuit 110 causes display 130 to display image 131 illustrated in FIG. 2, when electricity storage system 200 is activated. Control circuit 110 determines whether electricity storage system 200 is in the predetermined state by operation of operation unit 120 performed by the user.

When control circuit 110 determines, from operation performed by the user, that electricity storage system 200 is not in the predetermined state in which first PV 400 is connected to electricity storage system 200 (NO in step S301), control circuit 110 determines whether a voltage of at least a reference value is detected in terminal 700 (step S302).

Control circuit 110 continues to detect the voltage, when control circuit 110 determines that the voltage of at least the reference value is not detected in terminal 700 (NO is step S302).

On the other hand, when control circuit 110 determines that the voltage of at least the reference value is detected in terminal 700 (YES in step S302), control circuit 110 causes display 130 to display an image indicating that the voltage of at least the reference value is detected in terminal 700 (step S303).

Note that a reference value of a voltage that control circuit 110 determines as abnormal when the voltage is applied to terminal 700 is not particularly limited, when electricity storage system 200 is not in the predetermined state. The reference value of the voltage is to be optionally predetermined.

[Effects, etc.]

As has been described above, controller 100 according to the embodiment is a controller in electricity storage system 200 which includes first DC/DC converter 210 connected to storage battery 300, and bidirectional inverter 220 connected to first DC/DC converter 210. Controller 100 includes control circuit 110 which changes a content to be displayed by display 130 connected with controller 100, according to whether electricity storage system 200 is in a predetermined state in which first PV 400 is connected to bidirectional inverter 220 via a DC bus.

With the configuration described above, control circuit 110 can readily notify a user of the state of the connection between bidirectional inverter 220 and first PV 400 via a DC bus by changing, according to the state of the connection, an image which control circuit 110 causes display 130 which is connected with controller 100 to display. Accordingly, it is possible for controller 100 to improve user convenience.

In addition, for example, display 130 may be a display included in a personal computer, a smartphone, or the like which the user possesses, but controller 100 may further include display 130.

With the configuration described above, even when the user does not possess the display, control circuit 110 can readily notify the user of the state of the connection between electricity storage system 200 and first PV 400 by changing, according to the state of the connection, an image which control circuit 110 causes display 130 to display. Accordingly, it is possible for controller 100 to improve user convenience.

In addition, control circuit 110 may cause display 130 to display the amount of electric power generated by first PV 400 as an indication regarding the amount of the electric power generated by first PV 400, when electricity storage system 200 is in the predetermined state. Furthermore, control circuit 110 may cause display 130 to display a fixed value as the indication regarding the amount of the electric power generated by first PV 400, when electricity storage system 200 is not in the predetermined state.

With the configuration described above, even when the amount of electric power consumed by load 520 suddenly changes, it is possible to prevent control circuit 100 from controlling display 130 to display a value other than 0 as the amount of electric power generated due to a measurement error, although first PV 400 is not connected to electricity storage system 200, for example.

In addition, control circuit 110 may cause display 130 to display an indication for checking whether a state of connection between first PV 400 and second DC/DC converter 230 that is connected between first PV 400 and bidirectional inverter 220 is normal, when electricity storage system 200 is in the predetermined state. Furthermore, control circuit 110 need not cause display 130 to display the indication for checking whether the state of the connection between first PV 400 and second DC/DC converter 230 is normal, when electricity storage system 200 is not in the predetermined state.

With this configuration described above, the user can readily check whether the state of the connection between electricity storage system 200 and first PV 400 is appropriate.

In addition, controller 100 may further include communication unit 140. Control circuit 110 may cause display 130 to display an image for setting a signal to be received via communication unit 140, when electricity storage system 200 is in the predetermined state. The signal indicates an instruction for reducing the amount of electric power that flows in a reverse direction into system power source 600. Furthermore, control circuit 110 need not cause display 130 to display the image for setting the signal to be received via communication unit 140, when electricity storage system 200 is not in the predetermined state.

With this configuration described above, the user would not have to perform unnecessary setting when setting for controlling the charge and the discharge of electricity storage system 200. Accordingly, it is possible for controller 100 to further improve user convenience.

In addition, when a voltage of at least a reference value is detected in terminal 700 which connects second DC/DC converter 230 and first PV 400, control circuit 110 causes display 130 to display an indication showing that the voltage of at least the reference value is detected, when electricity storage system 200 is not in the predetermined state.

With this configuration described above, it is possible for the user to readily check that an unexpected voltage is applied to terminal 700. For example, when the voltage of at least the reference value is detected in terminal 700, the user can immediately check whether there is any anomaly in terminal 700. Accordingly, it is possible for controller 100 to further improve user convenience.

In addition, electricity storage system 200 according to an aspect of the present disclosure includes controller 100, first DC/DC converter 210, bidirectional inverter 220, and second DC/DC converter 230 connected between first PV 400 and bidirectional inverter 220.

With the configuration described above, electricity storage system 200 can readily notify the user whether the state of the connection between electricity storage system 200 and first PV 400 is appropriate, by changing an image which display 130 which is connected with electricity storage system 200 is caused to display, for example. Accordingly, it is possible for electricity storage system 200 to improve user convenience.

In addition, a recording medium according to an aspect of the present disclosure is a non-transitory computer-readable recording medium in which a program for causing a computer to execute a control method for controlling electricity storage system 200 that includes first DC/DC converter 210 connected to storage battery 300, and bidirectional inverter 230 connected to first DC/DC converter 210 is recorded. The recording medium according to an aspect of the present disclosure is the non-transitory computer-readable recording medium in which the program for causing the computer to execute the control method that changes a content to be displayed by display 130, according to whether electricity storage system 200 is in a predetermined state in which first PV 400 is connected to bidirectional inverter 220 via a DC bus.

With the configuration described above, it is possible to realize a program which can change an image to be displayed by display 130, according to the state of the connection between electricity storage system 200 and first PV 400. Accordingly, it is possible for a computer, such as controller 100, which executes the program to improve user convenience.

Other Embodiment

The above has described the controller according to the embodiment, the electricity storage system according to the embodiment, and the program according to the embodiment, yet the present disclosure is not limited to the above embodiment.

For example, electricity storage system 200 need not include second DC/DC converter 230. In this case, control circuit 110 determines that electricity storage system 200 is in the predetermined state when second DC/DC converter 230 and first PV 400 are connected to electricity storage system 200.

The present disclosure also encompasses: embodiments achieved by applying various modifications conceivable to those skilled in the art to each embodiment; and embodiments achieved by optionally combining the structural elements and the functions of each embodiment without departing from the scope of the present disclosure.

The invention claimed is:

1. A controller in an electricity storage system that includes a first DC/DC converter connected to a storage battery, and a bidirectional inverter connected to the first DC/DC converter, the controller comprising:
a control circuit which changes a content to be displayed by a display connected with the controller, according to whether the electricity storage system is in a predetermined state in which a solar cell module is connected to the bidirectional inverter via a DC bus, wherein
the control circuit:
causes the display to display an amount of electric power generated by the solar cell module as an indication regarding the amount of the electric power generated by the solar cell module, when the electricity storage system is in the predetermined state; and
causes the display to display a fixed value as the indication regarding the amount of the electric power generated by the solar cell module, when the electricity storage system is not in the predetermined state.

2. A controller in an electricity storage system that includes a first DC/DC converter connected to a storage battery, and a bidirectional inverter connected to the first DC/DC converter, the controller comprising:
a control circuit which changes a content to be displayed by a display connected with the controller, according to whether the electricity storage system is in a predetermined state in which a solar cell module is connected to the bidirectional inverter via a DC bus, wherein
the control circuit:
causes the display to display an indication for checking whether a state of connection between the solar cell module and a second DC/DC converter that is connected between the solar cell module and the bidirectional inverter is normal, when the electricity storage system is in the predetermined state; and
causes the display not to display the indication for checking whether the state of the connection between the solar cell module and the second DC/DC converter is normal, when the electricity storage system is not in the predetermined state.

3. A controller in an electricity storage system that includes a first DC/DC converter connected to a storage battery, and a bidirectional inverter connected to the first DC/DC converter, the controller comprising:
a control circuit which changes a content to be displayed by a display connected with the controller, according to whether the electricity storage system is in a predetermined state in which a solar cell module is connected to the bidirectional inverter via a DC bus; and
a communication unit, wherein
the control circuit:
causes the display to display an image for setting a signal to be received via the communication unit, when the electricity storage system is in the predetermined state, the signal indicating an instruction for reducing an amount of electric power that flows in a reverse direction into a system power source; and
causes the display not to display the image for setting the signal to be received via the communication unit, when the electricity storage system is not in the predetermined state.

4. A controller in an electricity storage system that includes a first DC/DC converter connected to a storage battery, and a bidirectional inverter connected to the first DC/DC converter, the controller comprising:
a control circuit which changes a content to be displayed by a display connected with the controller, according to whether the electricity storage system is in a predetermined state in which a solar cell module is connected to the bidirectional inverter via a DC bus, wherein
when a voltage of at least a reference value is detected in a terminal which connects a second DC/DC converter and the solar cell module, the control circuit causes the display to display an indication showing that the voltage of at least the reference value is detected, when the electricity storage system is not in the predetermined state, the second DC/DC converter being connected between the solar cell module and the bidirectional inverter.

5. An electricity storage system, comprising:
the controller according to claim 1;
the first DC/DC converter;
the bidirectional inverter; and
a second DC/DC converter connected between the solar cell module and the bidirectional inverter.

* * * * *